(12) United States Patent
Yang et al.

(10) Patent No.: US 8,884,844 B2
(45) Date of Patent: Nov. 11, 2014

(54) STACKED DISPLAY DEVICE WITH OLED AND ELECTRONIC PAPER DISPLAYS, AND DRIVING CIRCUITRY THEREIN

(71) Applicant: Fitipower Integrated Technology, Inc., Hsinchu (TW)

(72) Inventors: Chen-Chi Yang, Hsinchu (TW); Li-Shen Chang, Hsinchu (TW); Wen-Rong Lin, Hsinchu (TW)

(73) Assignee: Fitipower Integrated Technology, Inc., Hsinchu (TW)

( * ) Notice: Subject to any disclaimer, the term of this patent is extended or adjusted under 35 U.S.C. 154(b) by 0 days.

(21) Appl. No.: 13/846,938

(22) Filed: Mar. 18, 2013

(65) Prior Publication Data

US 2013/0241804 A1 Sep. 19, 2013

(30) Foreign Application Priority Data

Mar. 19, 2012 (TW) ............................. 101109363 A

(51) Int. Cl.
*G09G 5/00* (2006.01)
*G06F 3/14* (2006.01)
*G06F 1/16* (2006.01)

(52) U.S. Cl.
CPC ........ *G06F 3/1423* (2013.01); *G09G 2300/023* (2013.01); *G06F 1/1626* (2013.01); *G06F 1/1647* (2013.01)
USPC .................... 345/3.1; 345/4; 345/5; 345/156; 345/163

(58) Field of Classification Search
CPC ............... G02F 2201/44; G02F 1/167; G09G 2300/023; G09G 2330/021; G06F 3/1423
USPC .................................. 345/3.1, 4, 5, 156, 163
See application file for complete search history.

(56) References Cited

U.S. PATENT DOCUMENTS

| 7,002,531 | B2* | 2/2006 | Koike ............................. 345/3.1 |
| 7,737,928 | B2* | 6/2010 | Huang et al. .................... 345/87 |
| 7,956,820 | B2* | 6/2011 | Huitema et al. ............... 345/3.1 |
| 8,063,887 | B2* | 11/2011 | Barrus et al. ................... 345/173 |
| 8,106,852 | B2* | 1/2012 | Fujinawa et al. ................. 345/4 |
| 8,149,183 | B2* | 4/2012 | Fricke et al. ...................... 345/4 |
| 8,284,118 | B2* | 10/2012 | Perry et al. ........................ 345/5 |
| 8,451,193 | B2* | 5/2013 | Namm et al. ...................... 345/4 |
| 8,648,772 | B2* | 2/2014 | Hebenstreit et al. .............. 345/5 |
| 2002/0122013 | A1* | 9/2002 | Koike ............................. 345/3.2 |
| 2003/0103021 | A1* | 6/2003 | Young et al. .................... 345/76 |
| 2007/0139299 | A1* | 6/2007 | Huang et al. .................... 345/3.1 |
| 2008/0007486 | A1* | 1/2008 | Fujinawa et al. ................. 345/5 |
| 2008/0192013 | A1* | 8/2008 | Barrus et al. ................... 345/173 |

(Continued)

*Primary Examiner* — Gregory J Tryder
*Assistant Examiner* — Peter D McLoone
(74) *Attorney, Agent, or Firm* — Novak Druce Connolly Bove + Quigg LLP

(57) ABSTRACT

An exemplary electronic device includes a first display and a second display. The first display includes a number of first pixels. Each first pixel defines a first display region. Each first display region displays first visual content when voltages are applied to the first pixel and displays no first visual content when no voltage is applied to the first pixel. Each first display region is transparent or translucent when displaying no first visual content. The second display includes a number of second pixels. Each second pixel defines a second display region for displaying second visual content. The first visual content is viewable whether or not the second display displays the second visual content, and the second visual content is viewable when one or more first display regions corresponding to the second display region are transparent or translucent.

19 Claims, 9 Drawing Sheets

(56) References Cited

U.S. PATENT DOCUMENTS

| | | | |
|---|---|---|---|
| 2008/0211734 A1* | 9/2008 | Huitema et al. | 345/3.1 |
| 2009/0027306 A1* | 1/2009 | Kawabe | 345/3.1 |
| 2009/0027323 A1* | 1/2009 | Choi | 345/88 |
| 2009/0033587 A1* | 2/2009 | Fricke et al. | 345/1.3 |
| 2009/0146913 A1* | 6/2009 | Tanabe | 345/3.1 |
| 2009/0256830 A1* | 10/2009 | Klinghult et al. | 345/211 |
| 2010/0253671 A1* | 10/2010 | Perry et al. | 345/212 |
| 2010/0309096 A1* | 12/2010 | Inoh | 345/5 |
| 2011/0043435 A1* | 2/2011 | Hebenstreit et al. | 345/5 |
| 2011/0050545 A1* | 3/2011 | Namm et al. | 345/5 |
| 2013/0155092 A1* | 6/2013 | Chuang et al. | 345/589 |
| 2013/0169512 A1* | 7/2013 | Yang | 345/5 |
| 2013/0215032 A1* | 8/2013 | Yang et al. | 345/163 |
| 2014/0071023 A1* | 3/2014 | Chu | 345/3.1 |

* cited by examiner

STACKED DISPLAY DEVICE WITH OLED AND ELECTRONIC PAPER DISPLAYS, AND DRIVING CIRCUITRY THEREIN

BACKGROUND

1. Technical Field

The present disclosure relates to display technology, particularly to, an electronic device including multiple displays.

2. Description of Related Art

Traditional electronic devices include a single display for outputting visual content. For example, a traditional electronic device may include an organic light-emitting diode (OLED) display for outputting color visual content. In another example, a traditional device may include an electronic paper display for outputting black-and-white visual content using minimal power. The type of display included in a traditional electronic device is typically based on an assumption about the visual content it will most often display, because different types of displays may be optimal, in performance or efficiency, for different types of visual content. For example, an OLED display may be optimal for high-resolution or dynamic color content while an electronic paper display may be optimal for relatively static black-and-white content. However, a traditional device may display multiple types of visual content even though its display may only be optimal for a single type of visual content.

Therefore, it is desirable to provide a means which can overcome the above-mentioned problems.

BRIEF DESCRIPTION OF THE DRAWINGS

The components in the drawing are not necessarily drawn to scale, the emphasis instead being placed upon clearly illustrating the principles of the present disclosure.

DETAILED DESCRIPTION

Reference will be made to the drawings to describe specific exemplary embodiments of the present disclosure.

Figure 1:
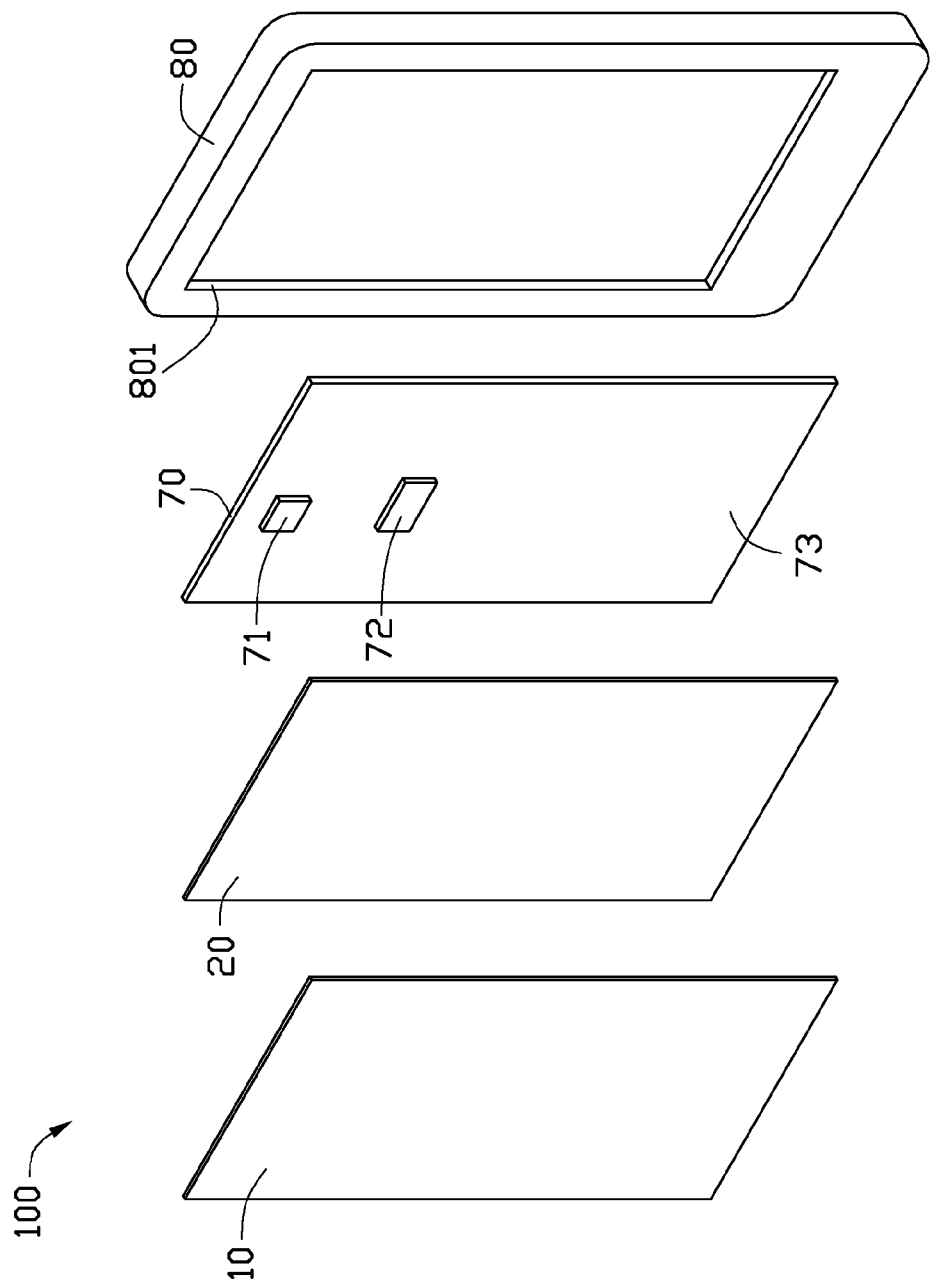
FIG. 1 is an exploded, isometric view of an electronic device for switching between a first display of one type and a second display of a different type, according to an exemplary embodiment.
Figure 2:
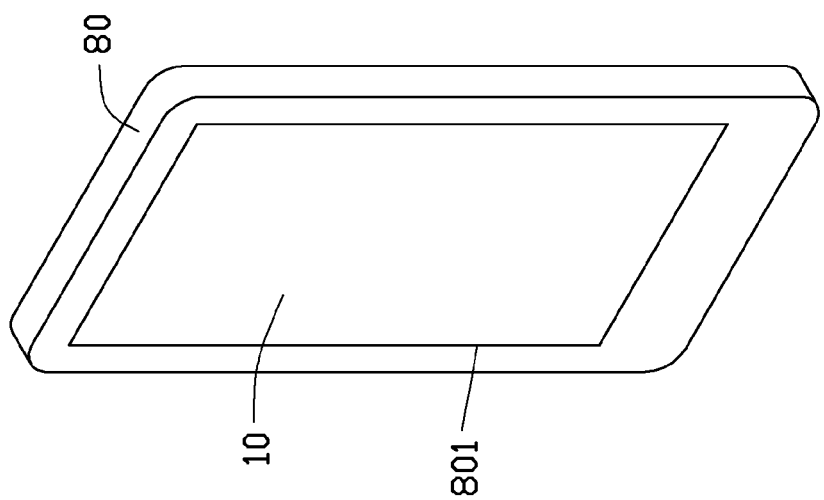
FIG. 2 is an assembled view of the electronic device of FIG. 1.
Figure 3:
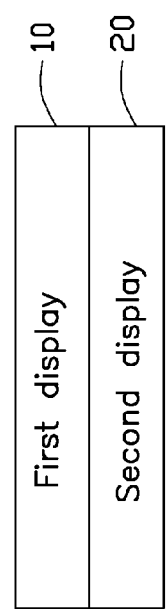
FIG. 3 is an isometric view of the first display being stacked with the second display of the electronic device of FIG. 1.

Referring to FIGS. 1-3, an electronic device 100 includes a first display 10, a second display 20, a circuit board 70, and a receiving shell 80. The circuit board 70 includes a control circuitry 71, a storage 72, and a board 73. The control circuitry 71 and the storage 72 are both positioned on the board 73. The receiving shell 80 defines an opening 801 and receives the first display 10, the second display 20, and the circuit board 70 therein. The first display 10, the second display 20, and the circuit board 70 are stacked with each other, and the second display 20 is positioned between the first display 10 and the circuit board 70. The first display 10 is exposed at the opening 801, such that visual content displayed by the electronic device 100 is viewable via the opening 801. In some embodiments, the electronic device 100 can include other components not shown in FIG. 1, such as a touchscreen or a power supply.

The first display 10 and the second display 20 are configured to display visual content. The first display 10 is a different type than the second display 20. The first display 10 may be a video display, which needs no extra light source to display the visual content, such as an OLED display, for example. The second display 20 may be a type which consumes minimal power when displaying visual content, such as an electronic paper display, for example. The first display 10 includes a plurality of first display regions 125 (shown in FIG. 4), and the second display 20 includes a plurality of second display regions 225 (shown in FIG. 4). Each of the first and second display regions 125, 225 may be independently enabled or activated. For example, portions of the first display 10 may be activated to provide visual content while other portions of the first display 10 remain inactive. Portions of the second display 20 corresponding to the activated portions of the first display 10 remain inactive, while other portions of the second display 20 corresponding to the inactive portions of the first display 10 may be activated.

The storage 72 stores the visual content and/or information related to the visual content such as the rate of change or color composition of the visual content. The control circuitry 71 is electrically connected to the first display 10 and the second display 20. The control circuitry 71 includes various processing circuits or processors operative to determine at least one feature of the visual content displayed by the first display 10 and the second display 20, and selectively enable at least one of the first display 10 and the second display 20, based on the at least one determined feature, to display the visual content.

For example, the control circuitry 71 is operative to distinguish the dynamic visual content having a rate of change above a predetermined threshold from the static visual content having a rate of change below or equal to the predetermined threshold, selectively enable the second display 20 to display static visual content and selectively enable the first display 10 to display dynamic visual content, so as to save power of the electronic device 100.

For simplicity, the visual content displayed by the first display 10 is called a first display content, and the display content displayed by the second display 20 is called a second display content.

Figure 4:
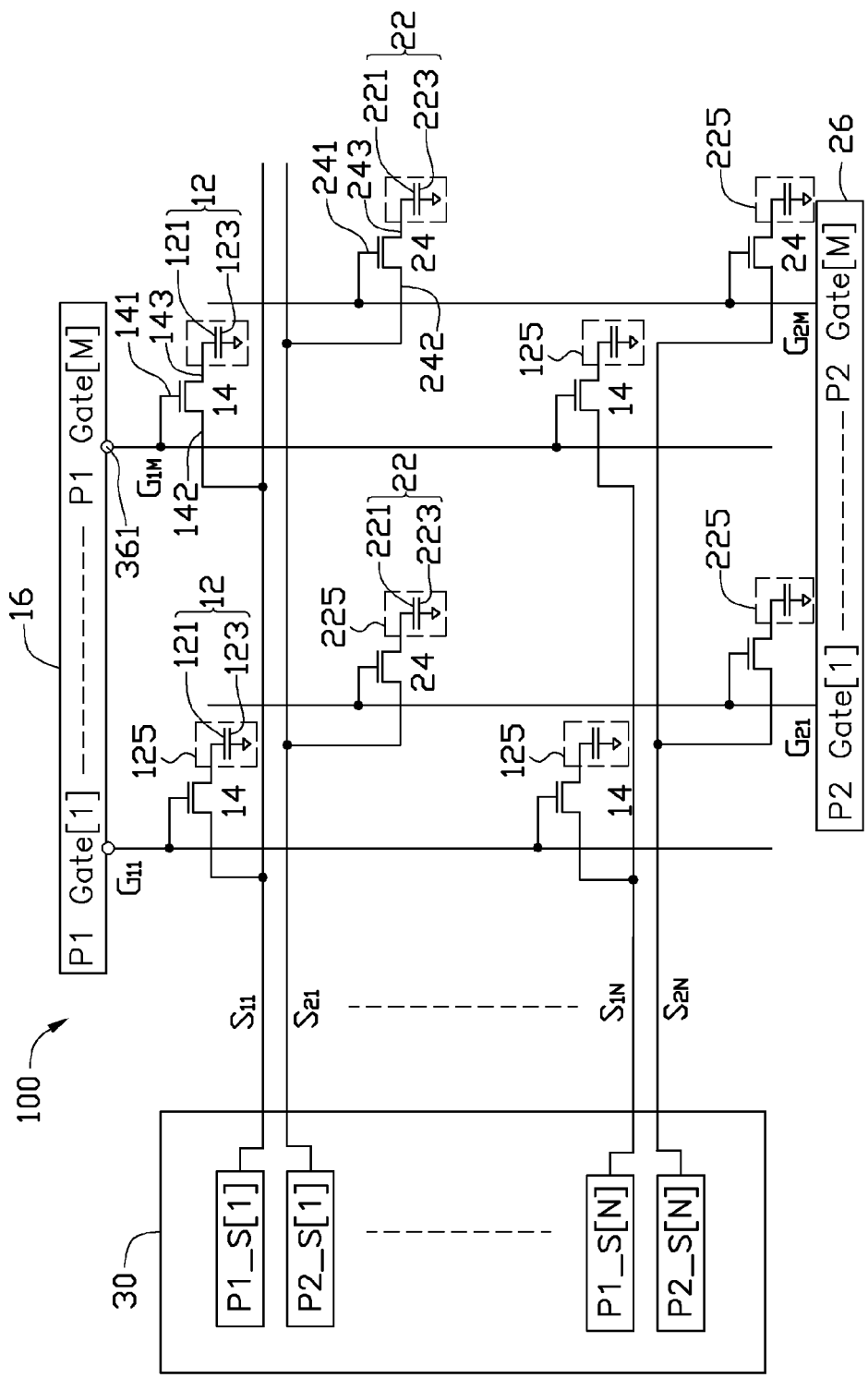
FIG. 4 is a partial circuit diagram of an electronic device according to a first embodiment of the present disclosure.

Referring to FIG. 4, a partial circuit diagram of the electronic device 100 according to a first embodiment of the present disclosure is shown. The first display 10 and the second display 20 include a joint source driver 30. That is, the source driver 30 is capable of activating both the first display 10 and the second display 20. The first display 10 further includes a first gate driver 16, a plurality of first switches 14, a plurality of first pixels 12, a plurality of gate lines $G_{11} \sim G_{1M}$ (M is equal to 2, 3, 4, 5, ...), a plurality of source lines $S_{11} \sim S_{1N}$ (N is equal to 2, 3, 4, 5, ...) crossing, but insulated from the plurality of gate lines $G_{11} \sim G_{1M}$. Each first switch 14 includes a control end 141, a first conductive end 142, and a second conductive end 143. The first switches 14 may be thin film transistors (TFTs), for example. Accordingly, the control end 141 is a gate electrode, the first conductive end 142 is a source electrode, and the second conductive end 143 is a drain electrode. Each first pixel 12 includes a first pixel electrode 121 and a first common electrode 123 opposite to the first pixel electrode 121. Each first pixel 12 defines a first display region 125 for displaying the first display content which depends on voltage differences applied between the first pixel electrode 121 and the first common electrode 123. In the embodiment, the first pixel electrode 121 and the first common electrode 123 can, for example, be an anode electrode and a cathode electrode of the OLED display.

The control ends 141 of the first switches 14 are connected to the first gate driver 16 via the plurality of first gate lines $G_{11}$~$G_{1M}$. The first conductive ends 142 of the first switches 14 are connected to the source driver 30 via the plurality of first data lines $S_{11}$~$S_{1N}$. The second conductive ends 143 of the first switches 14 are respectively connected to the first pixel electrodes 121.

The second display 20 further includes a second gate driver 26, a plurality of second switches 24, a plurality of second pixels 22, a plurality of gate lines $G_{21}$~$G_{2M}$, a plurality of source lines $S_{21}$~$S_{2N}$ crossing, but insulated from, the plurality of gate lines $G_{21}$~$G_{2M}$. Each second switch 24 includes a control end 241, a second conductive end 242, and a second conductive end 243. The second switches 24 may be TFTs, for example. Accordingly, the control end 241 is a gate electrode, the second conductive end 242 is a source electrode, and the second conductive end 243 is a drain electrode. Each second pixel 22 includes a second pixel electrode 221 and a second common electrode 223 opposite to the second pixel electrode 221. Each second pixel 22 defines a second display region 225 for displaying the second display content which depends on voltage differences applied between the second pixel electrode 221 and the second common electrode 223. In the embodiment, the second pixel electrode 221 and the second common electrode 223 can for example be a positive electrode and a negative electrode of the E-paper display.

The control ends 241 of the second switches 24 are connected to the second gate driver 26 via the plurality of second gate lines $G_{21}$~$G_{2M}$. The second conductive ends 242 of the second switches 24 are connected to the source driver 30 via the plurality of second data lines $S_{21}$~$S_{2N}$. The second conductive ends 243 of the second switches 24 are respectively connected to the second pixel electrodes 221.

The source driver 30 generates a plurality of first data signals and a plurality of second data signals. The source driver 30 is capable of outputting the first data signals and the second data signals simultaneously, and is also capable of outputting the first data signals and the second data signals asynchronously. The first gate driver 16 generates a plurality of first scanning signals and outputs the first scanning signals. The second gate driver 26 generates a plurality of second scanning signals and outputs the second scanning signals. The control ends 141 of the first switches 14 receive the first scanning signals. The control ends 241 of the second switches 24 receive the second scanning signals. The first conductive ends 142 of the first switches 14 receive the first data signals via the first data lines $S_{11}$~$S_{1N}$ and output the received first data signals to the first pixel electrodes 121 when the control ends 141 of the first switches 14 are activated by the first scanning signals. The second conductive ends 241 of the second switches 24 receive the second data signals via the second data lines $S_{21}$~$S_{2N}$ and output the received second data signals to the second pixel electrodes 221 when the control ends 242 of the second switches 24 are activated by the second scanning signals. The first common electrodes 123 receive a first common voltage from a voltage generating circuit (not shown). The second common electrodes 223 receive a second common voltage from the voltage generating circuit.

Each first display region 125 displays the first visual content when voltages are applied to the first pixel 12, and does not display the first visual content when no voltage is applied to the first pixel 12. Each first display region 125 is transparent or translucent when no first visual content is displayed. The first visual content displayed by the first display 10 is viewable by a user whether or not the second visual content is displayed by the second display 20. When one or more first display regions 125 are transparent or translucent, the second visual content displayed by corresponding second display regions 225 is viewable by the user. Accordingly, the electronic device 100 is capable of switching between the first display 10 and the second display 20 to display the first visual content and/or the second visual content.

As previously described, the electronic device 100 is capable of switching between the first display 10 and the second display 20 based on one or more features of the visual content. Accordingly, the electronic device 100 displays multiple types of visual content because the electronic device 100 employs multiple displays each of which are optimized for particular types of visual content.

Figure 5:
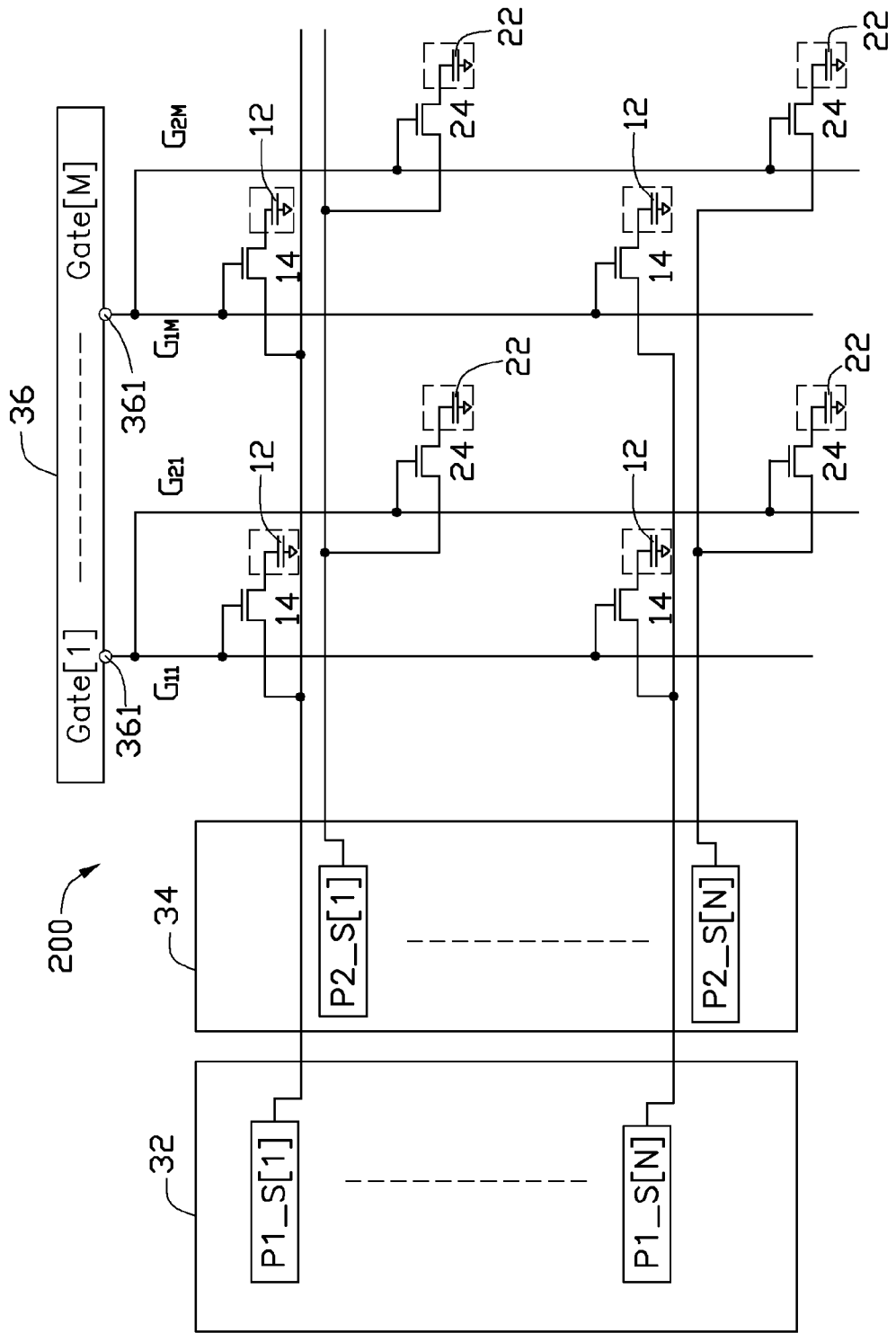
FIG. 5 is a partial circuit diagram of an electronic device according to a second embodiment of the present disclosure.

Referring to FIG. 5, a partial circuit diagram of an electronic device 200 according to a second embodiment of the present disclosure is shown. The electronic device 200 differs from the electronic device 100 of the first embodiment in that a first source driver 32 and a second source driver 34 are employed by the electronic device 200 instead of the joint source driver 30 of the electronic device 100. A first display (not labeled) and a second display (not labeled) include a joint gate driver 36 instead of the first and second gate drivers 16 and 26. The gate driver 36 includes a plurality of outputs 361. Each output 361 is connected to a first gate line $G_{1M}$ and a second gate line $G_{2M}$, and different outputs 361 are connected to different first gate lines $G_{11}$~$G_{1M}$ and different second gate lines $G_{21}$~$G_{2M}$. The gate driver 36 generates a plurality of scanning signals and outputs the plurality of scanning signals to the first and second gate lines $G_{11}$~$G_{1M}$, $G_{21}$~$G_{2M}$. The first switches 14 and the second switches 24 connected to the same output 361 of the gate driver 36 via the corresponding first and second gate lines $G_{1M}$, $G_{2M}$ are simultaneously activated by a corresponding scanning signal. The first source driver 32 and the second source driver 34 are capable of outputting the first data signals to the first pixels 12 and the second data signals to the second pixels 22, which are connected to the same output 361 as the first pixels 12, simultaneously or asynchronously.

Figure 6:
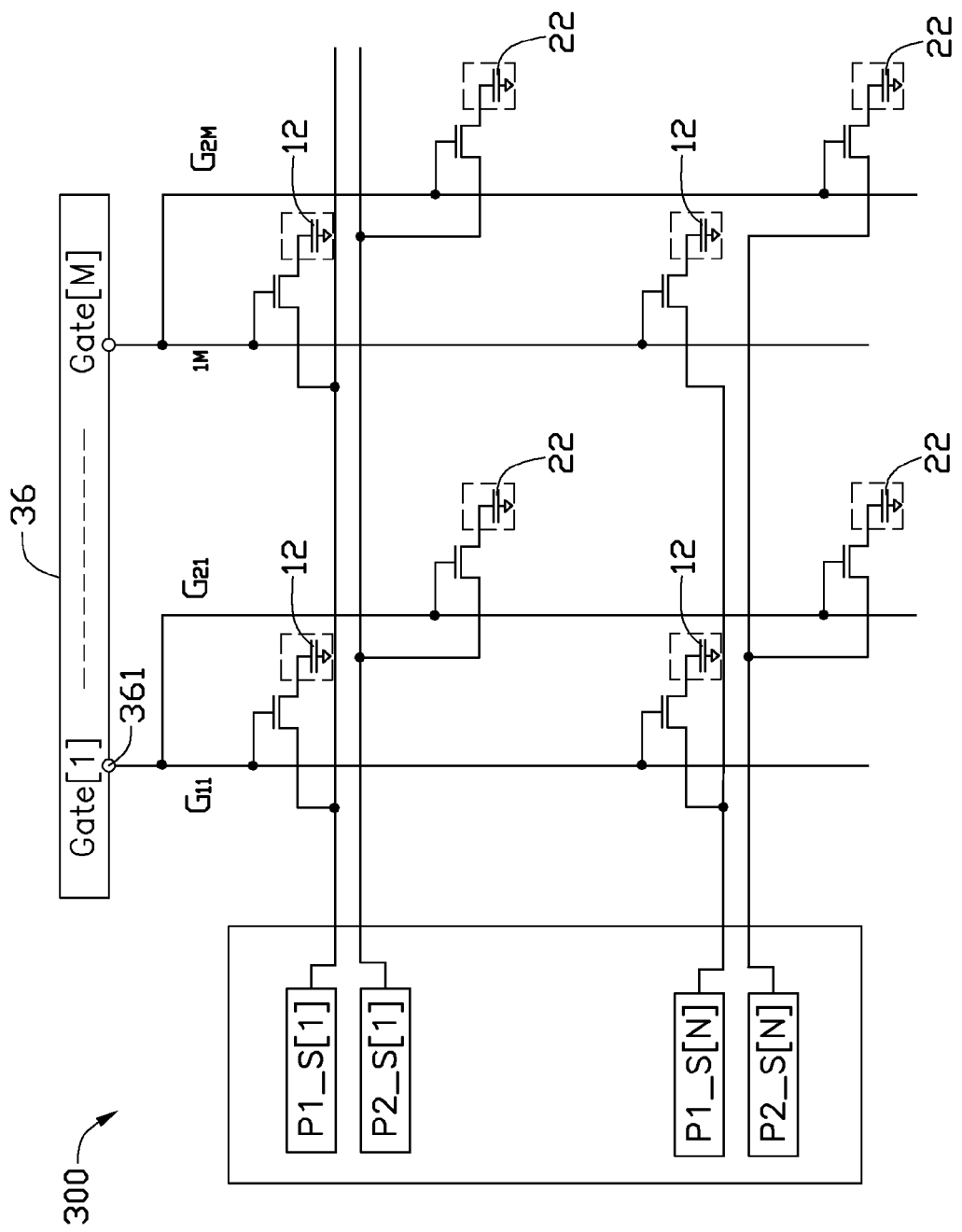
FIG. 6 is a partial circuit diagram of an electronic device according to a third embodiment of the present disclosure.

Referring to FIG. 6, a partial circuit diagram of an electronic device 300 according to a third embodiment of the present disclosure is shown. The same elements of the electronic device 300 and the electronic device 100 have the same reference numbers and different elements of the electronic devices 300, 100 have different reference numbers. The electronic device 300 differs from the electronic device 100 of the first embodiment in that a joint gate driver 36 is employed by the electronic device 300 instead of the first and second gate drivers 16 and 26 of the electronic device 100. When a corresponding first gate line $G_{1M}$ and a corresponding second gate line $G_{2M}$ which is connected to the same output 361 of the gate driver 36 as the first gate line $G_{1M}$ receive a scanning signal, the first pixels 12 and the second pixels 22 which are both connected to the same output 361 via the corresponding first and second gate lines $G_{1M}$, $G_{2M}$ simultaneously receive the first data signals and the second data signals, respectively.

Figure 7:
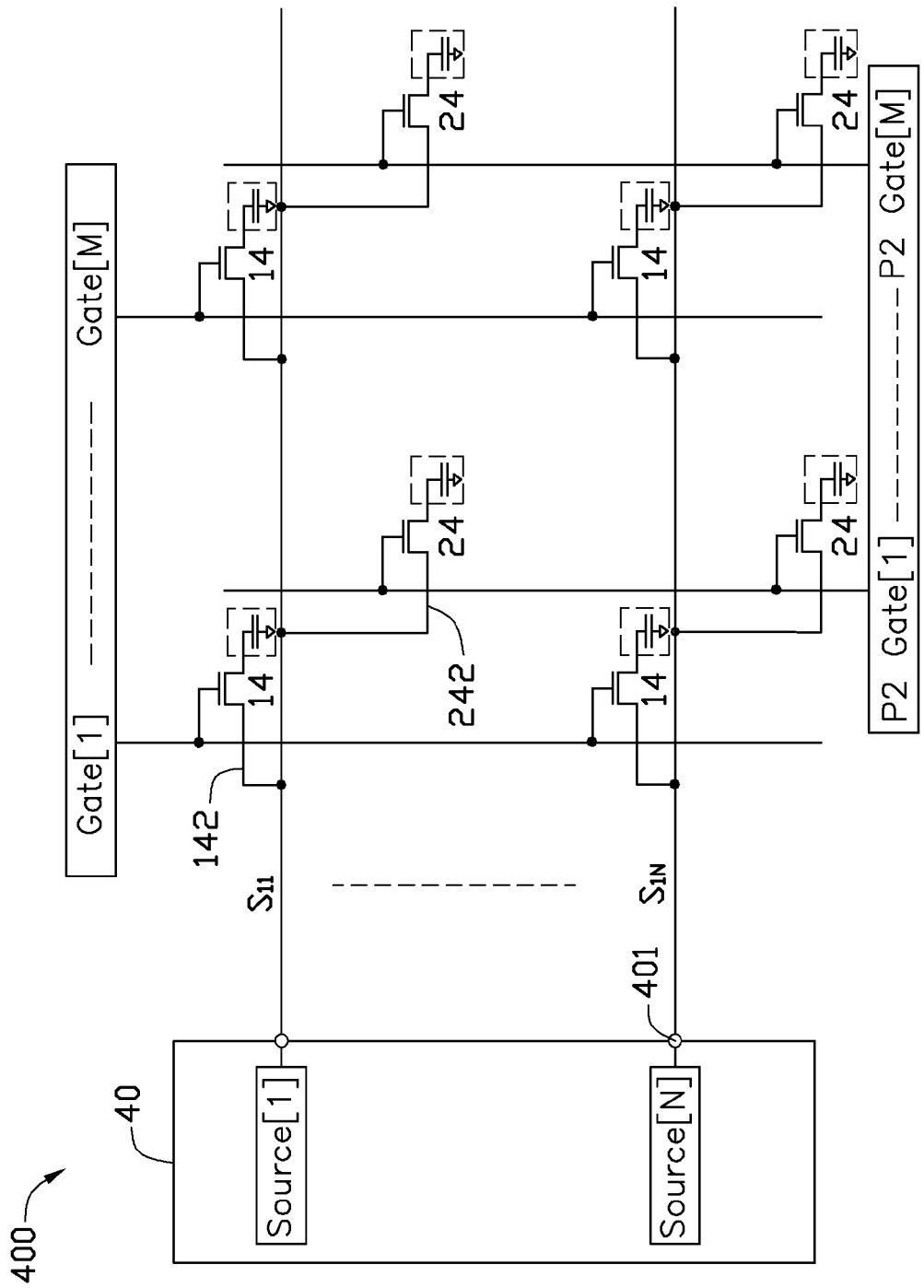
FIG. 7 is a partial circuit diagram of an electronic device according to a fourth embodiment of the present disclosure.

Referring to FIG. 7, a partial circuit diagram of an electronic device 400 according to a fourth embodiment of the present disclosure is shown. The same elements of the electronic device 400 and the electronic device 100 have the same reference numbers and different elements of the electronic devices 400, 100 have different reference numbers. The electronic device 400 differs from the electronic device 100 of the first embodiment in that the number of outputs 40 of a joint source driver 40 employed by the electronic device 400 are half the number of outputs (not labeled) of the joint source driver 30 employed by the electronic device 100. A second display (not labeled) and a first display (not labeled) of the electronic device 400 share the first data lines $S_{11}$~$S_{1N}$. The second data lines $S_{21}$~$S_{2N}$ are omitted. Each output 401 is connected to the first conductive ends 142 of a portion of the first switches 14 and the second conductive ends 242 of a portion of the second switches 24 via a corresponding data line $S_{1N}$. The source driver 40 generates the first source data signals and second data signals, and asynchronously outputs the first source data signals or second data signals to the same data line $S_{1N}$.

Figure 8:
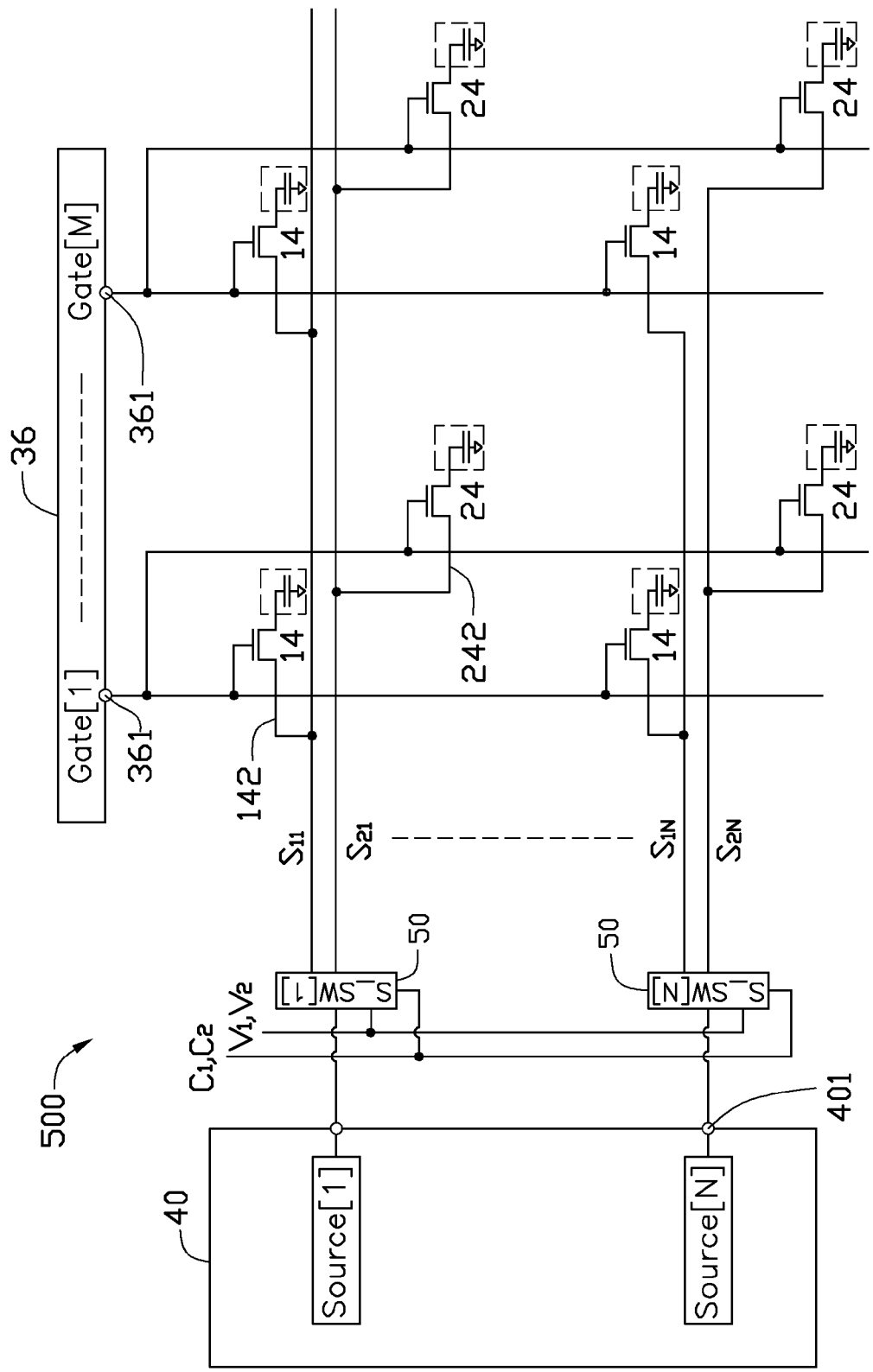
FIG. 8 is a partial circuit diagram of an electronic device according to a fifth embodiment of the present disclosure.

Referring to FIG. 8, a partial circuit diagram of an electronic device 500 according to a fifth embodiment of the present disclosure is shown. The electronic device 500 differs from the electronic device 400 of the fourth embodiment in that not only is a joint gate driver 36 employed by the electronic device 500 instead of a first gate driver (not labeled) and a second gate driver (not labeled) of the electronic device 400, but also the electronic device 500 further includes a plurality of joint third switches 50. Each different output 401 is connected to a different first data line $S_{1N}$ and a different second data line $S_{2N}$ via a different third switch 50. The third switches 50 selectively output the first data signals and the second data signals according to different control signals $C_1$, $C_2$. In detail, the third switches 50 selectively output the first data signals to the first conductive ends 142 of the first switches 14 via the first data lines $S_{11}$~$S_{1N}$ according to the first control signal $C_1$, and simultaneously output a first voltage $V_1$ to the first conductive ends 242 of the second switches 24, which are connected to the same output 361 of the gate driver 36 as the first switches 14, via the second data lines $S_{21}$~$S_{2N}$. The third switches 50 selectively output the second data signals to the first conductive ends 242 of the second switches 24 via the second data lines $S_{21}$~$S_{2N}$ according to a second control signal $C_2$, and simultaneously output a second voltage $V_2$ to the first conductive ends 142 of the first switches 14, which are connected to the same output 361 of the gate driver 36 as the second switches 24, via the first data lines $S_{11}$~$S_{1N}$. The first voltage $V_1$ may be equal to the first common voltage. The second voltage $V_2$ may be equal to the second common voltage.

Figure 9:
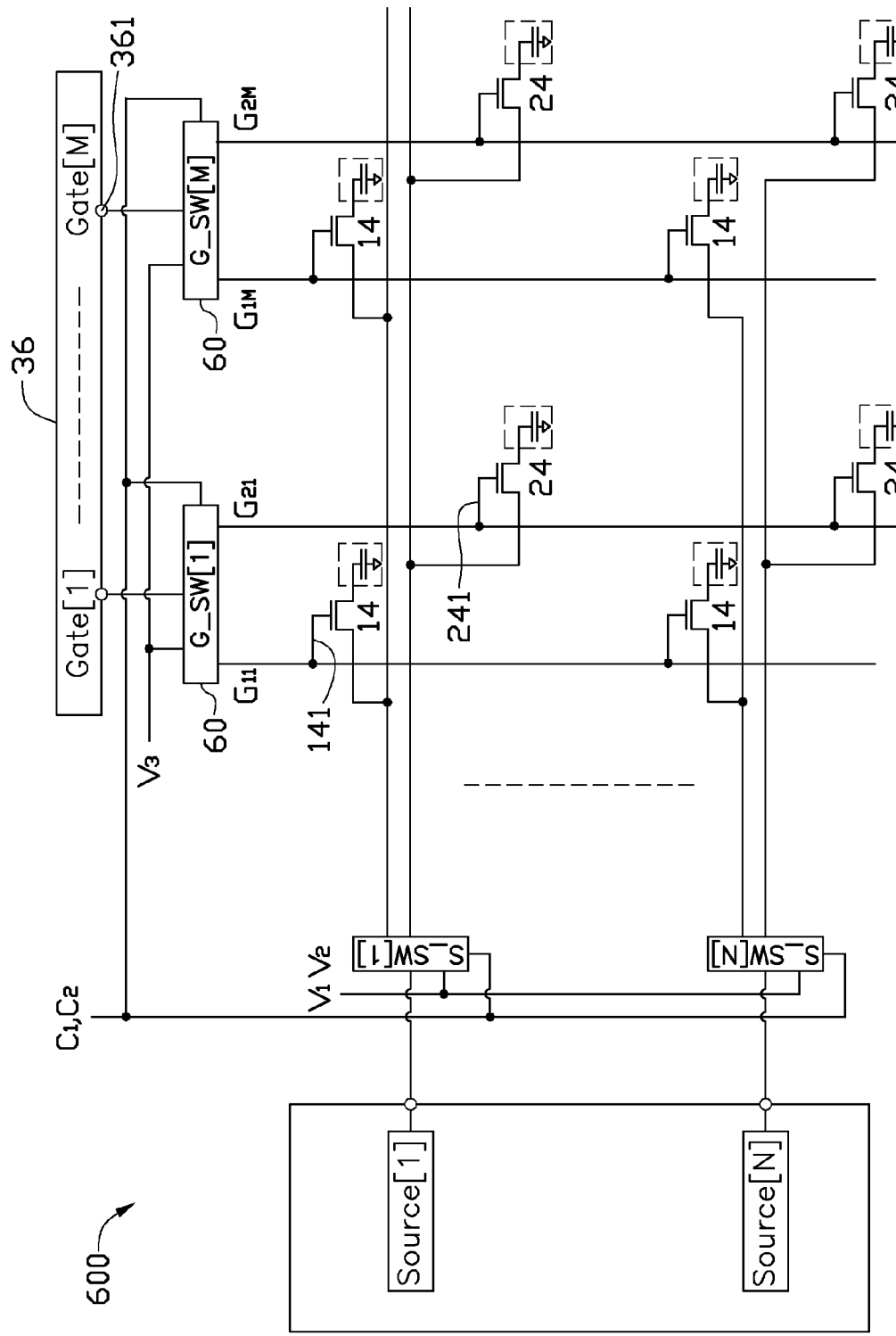
FIG. 9 is a partial circuit diagram of an electronic device according to a sixth embodiment of the present disclosure.

Referring to FIG. 9, a partial circuit diagram of an electronic device 600 according to a sixth embodiment of the present disclosure is shown. The electronic device 600 differs from the electronic device 500 of the fifth embodiment in that the electronic device 600 further includes a plurality of joint fourth switches 60. Each output 361 of the gate driver 36 is connected to a first gate line $G_{1M}$ and a second gate line $G_{2M}$ via a fourth switch 60. Different outputs 361 are connected to different first gate lines $G_{11}$~$G_{1M}$ and different second gate lines $G_{21}$~$G_{2M}$ via different fourth switches 60. The fourth switches 60 selectively output the scanning signals and a third voltage $V_3$ to the first gate lines $G_{11}$~$G_{1M}$ and the second gate lines $G_{21}$~$G_{2M}$ according to the first and second control signals $C_1$, $C_2$. The third voltage $V_3$ is configured to switch off the first switches 14 and the second switches 24. In detail, when the fourth switches 60 selectively output the scanning signals to the control ends 141 of the first switches 14 via a corresponding first gate line $G_{1M}$, the fourth switches 60 simultaneously output the third voltage $V_3$ to the control ends 241 of the second switches 24 via a corresponding second gate line $G_2 m$, which is connected to the same fourth switch 60 as the corresponding first gate line $G_{1M}$.

In alternative embodiments, the fourth switches 60 may selectively output the scanning signals and a third voltage $V_3$ to the first gate lines $G_{11}$~$G_{1M}$ and the second gate lines $G_{21}$~$G_{2M}$ according to a third control signal and a fourth control signal instead of the first and second control signals $C_1$, $C_2$. The first common voltage may equal the second common voltage.

It is believed that the present embodiments and their advantages will be understood from the foregoing description, and it will be apparent that various changes may be made thereto without departing from the spirit and scope of the embodiments or sacrificing all of their material advantages.

What is claimed is:

1. An electronic device, comprising:
a first display configured to display first visual content, the first display comprising a plurality of first pixels, each first pixel defining a first display region, each first display region displaying the first visual content when voltages are applied to a corresponding first pixel and no first visual content being displayed by the first display region when no voltage is applied to the corresponding first pixel, and each first display region being transparent or translucent when no first visual content is displayed;
a second display stacked with the first display, comprising a plurality of second pixels and configured to display second visual content, and each second pixel defining a second display region;
wherein the first display is a different type than the second display, the first visual content displayed by the first display is viewable by a user whether or not the second visual content is displayed by the second display, and when one or more first display regions are transparent or translucent, the second visual content displayed by corresponding second display regions is viewable via the transparent or translucent first display regions by the user; and
wherein the first display and the second display comprise a joint source driver or a joint gate driver at least, the joint source driver generates a plurality of first data signals and a plurality of second data signals and separately outputs the first data signals to the first display and the second data signals to the second display; the joint gate driver generates a plurality of scanning signals and outputs the plurality of scanning signals to the first and second displays.

2. The electronic device of claim 1, wherein the second display is an electronic paper display.

3. The electronic device of claim 2, wherein the first display is a video display.

4. The electronic device of claim 3, wherein the video display is an organic light-emitting diode display.

5. The electronic device of claim 4, further comprising a control circuitry connected to the first and second displays, wherein the control circuitry is operative to:
determine at least one feature of the first and second visual contents; and
selectively enable at least one of the electronic paper display and the organic light-emitting diode display, based on the at least one determined feature, to display the first visual content and/or the second visual content.

6. The electronic device of claim 5, wherein the first visual content is dynamic visual content, and the second visual content is static visual content, and the control circuitry is operative to:

distinguish the dynamic visual content having a rate of change above a threshold from the static visual content having a rate of change below the threshold;

selectively enable the electronic paper display to display the static visual content; and selectively enable the organic light-emitting diode display to display the dynamic visual content.

7. The electronic device of claim 6, further comprising a receiving shell having an opening, wherein the receiving shell receives the first and second displays and the control circuitry, the second display is positioned between the first display and the receiving shell, and the first display is exposed at the opening.

8. The electronic device of claim 7, wherein the first display and the second display comprises the joint source driver, the first display further comprises a first gate driver, a plurality of first gate lines, and a plurality of first switches, each first pixel comprises a first pixel electrode, each first switch comprises a control end, a first conductive end and a second conductive end, the control ends of the first switches are connected to the first gate driver via the plurality of first gate lines, the first conductive ends of the first switches are connected to the source driver via the plurality of first data lines, and the second conductive ends of the first switches are respectively connected to the first pixel electrodes; wherein the second display further comprises a second gate driver, a plurality of second gate lines, a plurality of first data lines, a plurality of second data lines, and a plurality of second switches, each second pixel comprises a second pixel electrode, each second switch comprises a control end, a first conductive end and a second conductive end, the control ends of the second switches are connected to the second gate driver via the plurality of second gate lines, the first conductive ends of the second switches are connected to the source driver via the plurality of second data lines, and the second conductive ends of the second switches are respectively connected to the second pixel electrodes; wherein the joint source driver generates a plurality of first data signals and a plurality of second data signals and separately outputs the first data signals and the second data signals, the first gate driver generates a plurality of first scanning signals, the second gate driver generates a plurality of second scanning signals, the control ends of the first switches receive the first scanning signals, the control ends of the second switches receive the second scanning signals, the first conductive ends of the first switches receive the first data signals and output the received first data signals to the first pixel electrodes when the control ends of the first switches are activated by the first scanning signals, and the first conductive ends of the second switches receive the second data signals and output the received second data signals to the second pixel electrodes when the control ends of the second switches are activated by the second scanning signals.

9. The electronic device of claim 7, wherein the first display and the second display comprises the joint gate driver, the first display further comprises a first source driver, a plurality of first gate lines, a plurality of first data lines, and a plurality of first switches, each first pixel comprises a first pixel electrode, each first switch comprises a control end, a first conductive end and a second conductive end, the control ends of the first switches are connected to the plurality of first gate lines, the first conductive ends of the first switches are connected to the first source driver via the plurality of first data lines, and the second conductive ends of the first switches are respectively connected to the first pixel electrodes; wherein the second display comprises a second source driver, a plurality of second gate lines, a plurality of second data lines, and a plurality of second switches, each second pixel comprises a second pixel electrode, each second switch comprises a control end, a first conductive end and a second conductive end, the control ends of the second switches are connected to the gate driver via the plurality of second gate lines, the first conductive ends of the second switches are connected to the second source driver via the plurality of second data lines, the second conductive ends of the second switches are respectively connected to the second pixel electrodes; wherein the joint gate driver comprises a plurality of outputs, each output is connected to a first gate line and a second gate line, different outputs are connected to different first and second gate lines; wherein the first source driver generates a plurality of first data signals, the second source driver generates a plurality of second data signals, the gate driver generates a plurality of scanning signals and outputs the plurality of scanning signals to the first and second gate lines, the first and second switches connected to the same output of the gate driver via the corresponding first and second gate lines are simultaneously activated when the corresponding first and second gate lines receive a scanning signal, the first conductive ends of the first switches receive the first data signals and output the received first data signals to the first pixel electrodes when the control ends of the first switches are activated by the scanning signals, and the first conductive ends of the second switches receive the second data signals and output the received second data signals to the second pixel electrodes when the control ends of the second switches are activated by the scanning signals.

10. The electronic device of claim 7, wherein the first display and the second display comprises the joint source driver and the joint gate driver, the first display further comprises a plurality of first gate lines, a plurality of first data lines, and a plurality of first switches, each first pixel comprises a first pixel electrode, each first switch comprises a control end, a first conductive end and a second conductive end, the control ends of the first switches are connected to the plurality of first gate lines, the first conductive ends of the first switches are connected to the joint source driver via the plurality of first data lines, and the second conductive ends of the first switches are respectively connected to the first pixel electrodes; wherein the second display further comprises a plurality of second gate lines, a plurality of second data lines, and a plurality of second switches, each second pixel comprises a second pixel electrode, each second switch comprises a control end, a first conductive end and a second conductive end, the control ends of the second switches are connected to the joint gate driver via the plurality of second gate lines, the first conductive ends of the second switches are connected to the joint source driver via the plurality of second data lines, and the second conductive ends of the second switches are respectively connected to the second pixel electrodes; wherein the joint gate driver comprises a plurality of outputs, each output is connected to a first gate line and a second gate line, different outputs are connected to different first and second gate lines; wherein the joint source driver generates a plurality of first data signals and a plurality of second data signals, and separately outputs the first and second data signals, the joint gate driver generates a plurality of scanning signals and outputs the plurality of scanning signals to the first and second gate lines, the first and second switches connected to the same output of the gate driver via the corresponding first and second gate lines are simultaneously activated when the corresponding first and second gate lines receive a scanning signal, the first conductive ends of the first switches receive the first data signals, and output the received first data signals to the first pixel electrodes when the control ends of the first switches are activated by the scanning signals, and the first conductive ends of the second switches receive the second data signals, and output the received second data signals to the second pixel electrodes when the control ends of the second switches are activated by the scanning signals.

11. The electronic device of claim 7, wherein the first display and the second display comprises the joint source driver and a plurality of joint data lines, the first display further comprises a first gate driver, a plurality of first gate lines, and a plurality of first switches, each first pixel comprises a first pixel electrode, each first switch comprises a control end, a first conductive end and a second conductive end, the control ends of the first switches are connected to the first gate driver via the plurality of first gate lines, the first conductive ends of the first switches are connected to the source driver via the plurality of data lines, and the second conductive ends of the first switches are respectively connected to the first pixel electrodes; wherein the second display further comprises a second gate driver, a plurality of second gate lines, a plurality of data lines, and a plurality of second switches, each second pixel comprises a second pixel electrode, each second switch comprises a control end, a first conductive end and a second conductive end, the control ends of the second switches are connected to the second gate driver via the plurality of second gate lines, the first conductive ends of the second switches are connected to the joint source driver via the plurality of data lines, and the second conductive ends of the second switches are respectively connected to the second pixel electrodes; wherein the joint source driver comprises a plurality of outputs, a different output of the source driver is connected to the first conductive ends of a portion of the first switches and the first conductive ends of a portion of the second switches via a different data line; wherein the joint source driver generates a plurality of first data signals and a plurality of second data signals, and asynchronously outputs the first data signals and the second data signals to the first conductive ends of the first switches and the first conductive ends of the second switches which are connected to the same data line as the first conductive ends of the first switches, the first gate driver generates a plurality of first scanning signals, the second gate driver generates a plurality of second scanning signals, the control ends of the first switches receive the first scanning signals, the control ends of the second switches receive the second scanning signals, the first conductive ends of the first switches receive the first data signals and output the received first data signals to the first pixel electrodes when the control ends of the first switches are activated by the first scanning signals, and the first conductive ends of the second switches receive the second data signals and output the received second data signals to the second pixel electrodes when the control ends of the second switches are activated by the second scanning signals.

12. The electronic device of claim 7, wherein the first display and the second display comprises the joint gate driver, the joint source driver, and a plurality of joint third switches, the first display further comprises a plurality of first gate lines, a plurality of first data lines, and a plurality of first switches, each first pixel comprises a first pixel electrode, each first switch comprises a control end, a first conductive end and a second conductive end, the control ends of the first switches are connected to the plurality of first gate lines, the first conductive ends of the first switches are connected to the plurality of first data lines, and the second conductive ends of the first switches are respectively connected to the first pixel electrodes; wherein the second display further comprises a plurality of second gate lines, a plurality of second data lines, and a plurality of second switches, each second pixel comprises a second pixel electrode, each second switch comprises a control end, a first conductive end and a second conductive end, the control ends of the second switches are connected to the joint gate driver via the plurality of second gate lines, the first conductive ends of the second switches are connected to the plurality of second data lines, and the second conductive end of each second switch is connected to a second pixel electrode; wherein the joint gate driver comprises a plurality of outputs, each output is connected to a first gate line and a second gate line, different outputs are connected to different first and second gate lines, the joint source driver comprises a plurality of outputs, a different output of the joint source driver is connected to a different first and second data lines via a different third switch; wherein the joint source driver generates a plurality of first data signals and a plurality of second data signals, the joint gate driver generates a plurality of scanning signals and outputs the plurality of scanning signals to the first and second gate lines, the first and second switches connected to the same output of the joint gate driver via the corresponding first and second gate lines are simultaneously activated when the corresponding first and second gate lines receive a scanning signal, the third switches selectively output the first data signals and the second data signals according to different control signals.

13. The electronic device of claim 12, wherein the third switches selectively outputs the first data signals according to a first control signal, and outputs the second data signals according to a second control signal, the first conductive ends of the first switches receive the first data signals when the third switches selectively output the first data signals from the joint source driver to the first data lines according to the first control signal, and the first conductive ends of the first switches output the received first data signals to the first pixel electrodes when the control ends of the first switches are activated by the scanning signals, and the first conductive ends of the second switches receive the second data signals when the third switches selectively output the second data signals from the joint source driver to the second data lines according to a second control signal, and the first conductive ends of the second switches output the received second data signals to the second pixel electrodes when the control ends of the second switches are activated by the scanning signals.

14. The electronic device of claim 13, wherein each first pixel further comprises a first common electrode opposite to the corresponding first pixel electrode, each second pixel further comprises a second common electrode opposite to the corresponding second pixel electrode, the first common electrode receives a first common voltage, the second common electrode receives a second common voltage, when the third switches selectively output the first data signals to the first conductive ends of the first switches which control ends are connected to one of the outputs of the joint gate driver via a corresponding first gate line, the third switches simultaneously selectively output a first voltage to the first conductive ends of the second switches which control ends are connected to the same one of the outputs of the joint gate driver via a corresponding second gate line; when the third switches selectively output the second data signals to the first conductive ends of the second switches which control ends are connected to one of the outputs of the joint gate driver via a corresponding second gate line, the third switches simultaneously selectively output a second voltage to the first conductive ends of the first switches which control ends are connected to the same one of the outputs of the gate driver via a corresponding first gate line.

15. The electronic device of claim 14, wherein the first voltage equals to the first common voltage and the second voltage equals to the second common voltage.

16. The electronic device of claim 13, wherein the first display and the second display further comprises a plurality of joint fourth switches, a different output of the joint gate driver is connected to a different first gate line and a different second gate line via a different fourth switch, the fourth switches selectively output the scanning signals from the gate driver to the control ends of the first switches according to a third control signal, and selectively output the scanning signals from the joint gate driver to the control ends of the second switches according to a fourth control signal.

17. The electronic device of claim 16, wherein when the fourth switches selectively output the scanning signals from the gate driver to the control ends of the first switches which first conductive ends are connected to one of the outputs of the joint source driver, the fourth switches simultaneously selectively output a third voltage to the first control ends of the second switches which first conductive ends are connected to the same one of the outputs of the joint source driver, so as to switch off the second switches; when the fourth switches selectively output the scanning signals from the joint gate driver to the control ends of the second switches which first conductive ends are connected to one of the outputs of the source driver, the fourth switches simultaneously selectively output the third voltage to the first control ends of the first switches which first conductive ends are connected to the same one of the outputs of the source driver, so as to switch off the first switches.

18. An electronic device, comprising:
a first display configured to display first visual content, the first display comprising a plurality of first pixels, each first pixel defining a first display region, each first display region displaying the first visual content when voltages are applied to a corresponding first pixel and no first visual content being displayed by the first display region when no voltage is applied to the corresponding first pixel, and each first display region being transparent or translucent when no first visual content is displayed;
a second display stacked with the first display, comprising a plurality of second pixels and configured to display second visual content, and each second pixel defining a second display region;
wherein the first display is a different type than the second display, the first visual content displayed by the first display is viewable by a user whether or not the second visual content is displayed by the second display, and when one or more first display regions are transparent or translucent, the second visual content displayed by corresponding second display regions is viewable via the transparent or translucent first display regions by the user; and
wherein the first display and the second display comprises a joint source driver, the first display further comprises a first gate driver, a plurality of first gate lines, and a plurality of first switches, each first pixel comprises a first pixel electrode, each first switch comprises a control end, a first conductive end and a second conductive end, the control ends of the first switches are connected to the first gate driver via the plurality of first gate lines, the first conductive ends of the first switches are connected to the source driver via the plurality of first data lines, and the second conductive ends of the first switches are respectively connected to the first pixel electrodes; wherein the second display further comprises a second gate driver, a plurality of second gate lines, a plurality of first data lines, a plurality of second data lines, and a plurality of second switches, each second pixel comprises a second pixel electrode, each second switch comprises a control end, a first conductive end and a second conductive end, the control ends of the second switches are connected to the second gate driver via the plurality of second gate lines, the first conductive ends of the second switches are connected to the source driver via the plurality of second data lines, and the second conductive ends of the second switches are respectively connected to the second pixel electrodes; wherein the joint source driver generates a plurality of first data signals and a plurality of second data signals and separately outputs the first data signals and the second data signals, the first gate driver generates a plurality of first scanning signals, the second gate driver generates a plurality of second scanning signals, the control ends of the first switches receive the first scanning signals, the control ends of the second switches receive the second scanning signals, the first conductive ends of the first switches receive the first data signals and output the received first data signals to the first pixel electrodes when the control ends of the first switches are activated by the first scanning signals, and the first conductive ends of the second switches receive the second data signals and output the received second data signals to the second pixel electrodes when the control ends of the second switches are activated by the second scanning signals.

19. An electronic device, comprising:
a first display configured to display first visual content, the first display comprising a plurality of first pixels, each first pixel defining a first display region, each first display region displaying the first visual content when voltages are applied to a corresponding first pixel and no first visual content being displayed by the first display region when no voltage is applied to the corresponding first pixel, and each first display region being transparent or translucent when no first visual content is displayed;
a second display stacked with the first display, comprising a plurality of second pixels and configured to display second visual content, and each second pixel defining a second display region;
wherein the first display is a different type than the second display, the first visual content displayed by the first display is viewable by a user whether or not the second visual content is displayed by the second display, and when one or more first display regions are transparent or translucent, the second visual content displayed by corresponding second display regions is viewable via the transparent or translucent first display regions by the user; and
wherein the first display and the second display comprises a joint gate driver, the first display further comprises a first source driver, a plurality of first gate lines, a plurality of first data lines, and a plurality of first switches, each first pixel comprises a first pixel electrode, each first switch comprises a control end, a first conductive end and a second conductive end, the control ends of the first switches are connected to the plurality of first gate lines, the first conductive ends of the first switches are connected to the first source driver via the plurality of first data lines, and the second conductive ends of the first switches are respectively connected to the first pixel electrodes; wherein the second display comprises a second source driver, a plurality of second gate lines, a plurality of second data lines, and a plurality of second switches, each second pixel comprises a second pixel electrode, each second switch comprises a control end, a first conductive end and a second conductive end, the control ends of the second switches are connected to the gate driver via the plurality of second gate lines, the first conductive ends of the second switches are connected to the second source driver via the plurality of second data lines, the second conductive ends of the second switches are respectively connected to the second pixel electrodes; wherein the joint gate driver comprises a plurality of outputs, each output is connected to a first gate line and a second gate line, different outputs are connected to different first and second gate lines; wherein the first source driver generates a plurality of first data signals, the second source driver generates a plurality of second data signals, the gate driver generates a plurality of scanning signals and outputs the plurality of scanning signals to the first and second gate lines, the first and second switches connected to the same output of the gate driver via the corresponding first and second gate lines are simultaneously activated when the corresponding first and second gate lines receive a scanning signal, the first conductive ends of the first switches receive the first data signals and output the received first data signals to the first pixel electrodes when the control ends of the first switches are activated by the scanning signals, and the first conductive ends of the second switches receive the second data signals and output the received second data signals to the second pixel electrodes when the control ends of the second switches are activated by the scanning signals.

* * * * *